Aug. 9, 1960
V. A. GILL ET AL
2,948,553
QUICK DISCONNECT VALVED COUPLING
Filed July 13, 1956
2 Sheets-Sheet 1
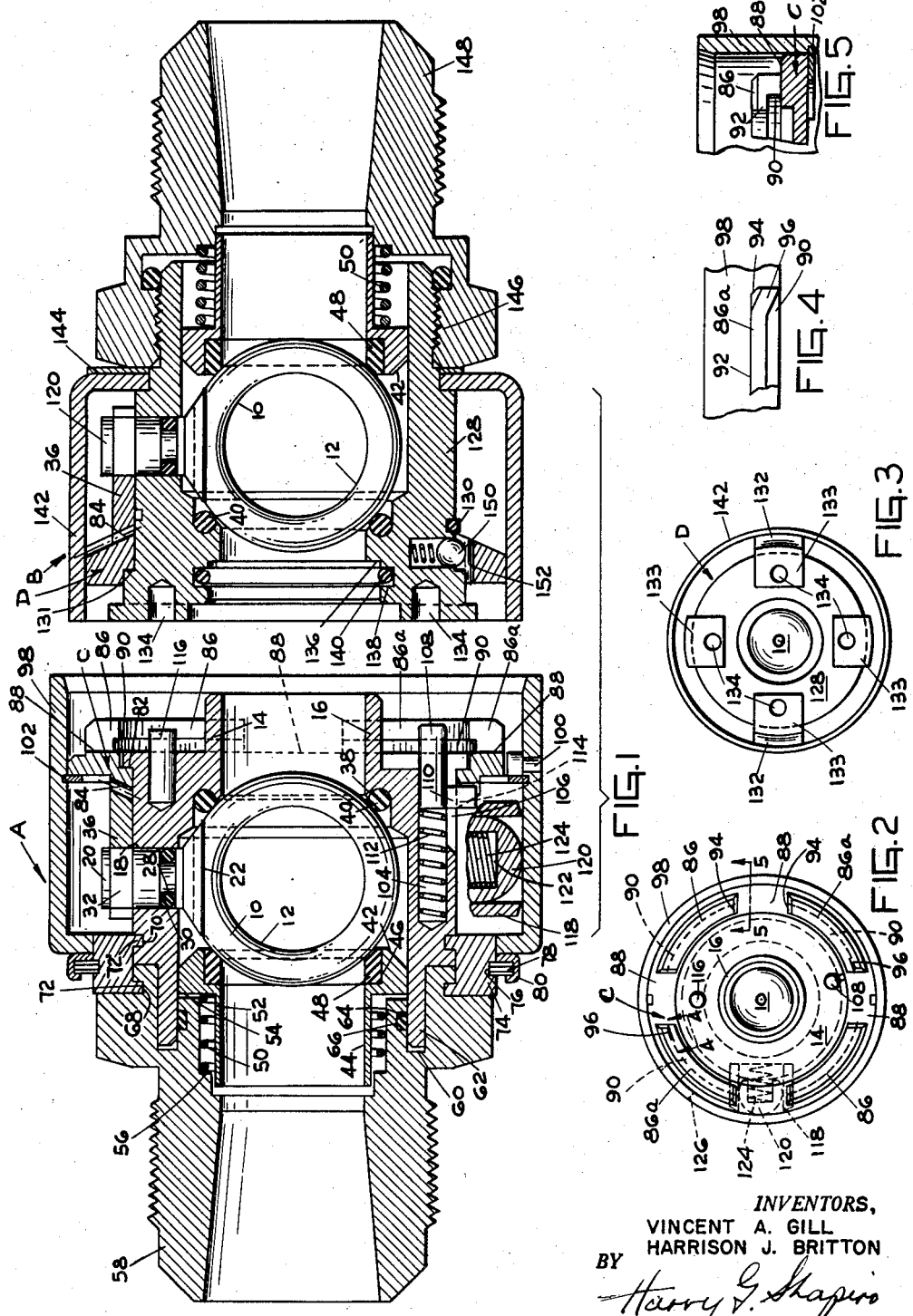
INVENTORS,
VINCENT A. GILL
HARRISON J. BRITTON
BY
Harry G. Shapiro
ATTORNEY

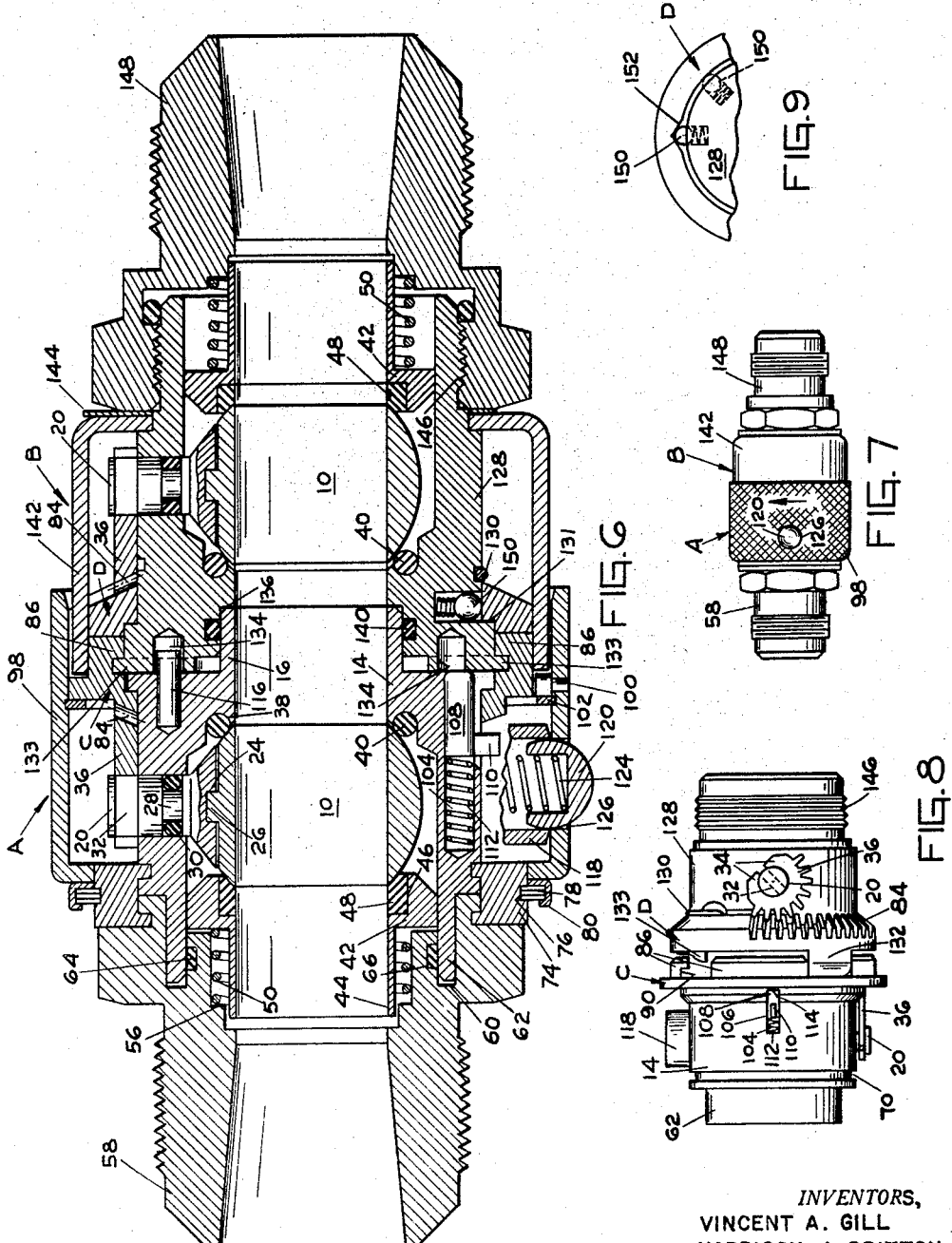

United States Patent Office 2,948,553
Patented Aug. 9, 1960

2,948,553

QUICK DISCONNECT VALVED COUPLING

Vincent A. Gill, Montclair, and Harrison J. Britton, East Orange, N.J.; said Gill assignor, by mesne assignments, to The Weatherhead Company, Cleveland, Ohio, a corporation of Ohio Filed July 13, 1956, Ser. No. 605,683

19 Claims. (Cl. 284—4)

The invention relates to quick disconnect couplings, and is more particularly directed to improvements in couplings of the type having a plug or check valve in each of a pair of coupling members, the valves being mounted for rotation to open and close about an axis generally perpendicular to the line of flow through the coupling. Providing the valves with a bore diameter equal to the internal diameter of the lines connected by the coupling members, permits obtaining a straight-through tubing effect with a minimum drop in pressure within the coupling.

Couplings of the type referred to are to be distinguished from couplings made with a single valve which is split. Split valves require close tolerance machining of the metal parts and present sealing problems, particularly when the pressure in a line is high. Also, while couplings having flap type valves may provide a generally straight-through tubing effect, the flaps must be moved back against the pressure in the line when opening, and therefore require effort beyond one's manual ability without tools, when there is substantial pressure in the line.

An object of the invention is to provide a coupling structure of the type under consideration which will furnish an improved seal between and within the coupling members, thereby permitting comparatively high fluid presssure within the coupling with a minimum of leakage.

Another object of the invention is to provide a coupling structure having safety means. The valves are locked in their closed position to prevent inadvertent opening. Tampering with the disconnected coupling members to open the valves is resisted. The valves, however, are automatically unlocked for rotation in phase to their open position when the coupling members are connected.

Another object of the invention is to provide a coupling structure which includes novel means for preventing torque being put upon the hose or pipes to which the coupling members are secured.

Still another object of the invention is to provide a coupling constructed to securely lock the connected coupling members together, the locking means also serving to indicate whether or not the valves are fully open.

A further object of the invention is to provide a valved coupling construction wherein the actuating parts are well protected against damage and tampering.

Still a further object of the invention is to provide an improved seal for a plug valve.

These, and other objects, advantages and results will be apparent from the following detailed description taken in conjunction with the drawings, in which:

Fig. 1 is a longitudinal, cross-sectional view of the coupling members made in accordance with the invention, the members being disconnected and the valves closed in this view;

Fig. 2 is an end view of the coupling member shown on the left in Fig. 1;

Fig. 3 is an end view of the coupling member shown on the right in Fig. 1;

Fig. 4 is a section taken approximately in the plane of line 4—4 of Fig. 2;

Fig. 5 is a section taken approximately in the plane of line 5—5 of Fig. 2;

Fig. 6 is a view similar to Fig. 1 showing the coupling members connected to each other with the valve in each coupling member in open position;

Fig. 7 is a plan view, on a reduced scale of the coupling shown in Fig. 6;

Fig. 8 is a plan view of the bodies of the connected coupling members, together with the means for connecting the members and actuating the valves the parts being coupled in a position 90° from that of Figs. 1 and 6; and Fig. 9 is a detailed view of means for locking the valve of the coupling member shown on the right in Fig. 1 in closed position.

Generally, the quick disconnect coupling of the present invention comprises a pair of coupling members A and B, the member A for convenience being termed the nipple member or half, and the member B, the socket member or half. The coupling members may each be provided with identical plug or check valves 10, which may be in the form of a spherical ball or cylinder provided with a bore or through-hole 12 having a diameter substantially equal to the internal diameter of the pipes or hose (not shown) to which the coupling members are connected. The valves are mounted within their respective coupling halves for rotation about an axis which is generrally perpendicular to the longitudinal axis of the coupling, or the line of fluid flow therethrough. The coupling members are constructed so that when disconnected, as shown in Fig. 1, the valves are closed and when connected, as shown in Fig. 6, the valves are in open position to provide a straight-through tubing effect with the line of fluid flow through the coupling substantially unimpeded.

In the preferred embodiment of the invention, and as shown in Fig. 1, the coupling member A comprises a hollow body or casing 14 having at its front end an annular nipple portion 16. The nipple portion may have an internal diameter substantially equal to the internal diameter of the pipe or hose to which the member is connected. The body is provided with a radially extending aperture 18 within which a short valve shaft 20 is mounted. At its lower end, the shaft is provided with a headed portion 22 within which, is shown in Fig. 6, a centrally disposed groove 24 is formed. The valve is provided with a mating tongue 26 fitted within the groove 24 to connect the valve for positive rotation with the shaft. The tongue and groove are dimensioned so that there is a slight amount of clearance between the side walls of the tongue and the adjacent walls of the groove, preferably on the order of 0.001 to 0.002 inch. The shaft is provided with a circumferential groove 28 within which a small O ring 30 is received. The ring may be of rubber or other suitable resilient, fluid-resistant material, and has a cross-section which will provide a tight but resilient seal between the shaft and the adjacent wall of the body. As best shown in Fig. 8, the shaft is also provided with side slots to furnish a flat sided central web 32 about which a pair of ears 34 of a gear segment 36 are snugly fitted.

The assembly of the described valve shaft in the body, with the valve on one side of the body and gear segment on the other furnishes a secure connection of the parts permitting rotation of the valve about an axis which is perpendicular to the longitudinal axis of the coupling without any undue wobble or eccentricity. The O ring between the shaft and the adjacent wall of the body provides a good seal for the rotatable shaft in addition to aiding in the prevention of wobble.

To provide a fluid tight seal for the illustrated spherical ball valve 10, the body 14 is provided with an annular groove 38 having its open side facing towards the valve. An O ring 40 formed of any suitable resilient material, which is also resistant to the type of fluids which will pass through the coupling, is disposed within the groove so that a squeeze-fit is provided against the outer surface of the valve. A ring of Teflon is preferred for its low coefficient of friction, coupled with its desirable measure of resiliency and resistance to most solvents. On the opposite side of the valve, a metal retainer ring 42 is provided, the ring having a bore 44 of a diameter substantially equal to the internal diameter of the nipple portion 16. The retainer is provided at its forward end with an annular recess 46 within which a ring 48, preferably of Teflon, is seated. The valve engaging surface of the ring is contoured for mating surface engagement with the valve. The ring is resiliently pressed against the valve by a coiled compression spring 50 surrounding a sleeve-like portion 52 of the retainer. One end of the spring is in engagement with a wall 54 extending laterally from the retainer, the other end of the spring being in engagement with a shoulder 56 formed within a threaded fitting 58. The fitting is provided with an annular groove or depression 60, within which is received an annular sleeve-like extension 62 formed integrally with the body 14. An O ring 64 of rubber, or other suitable resilient material, is disposed between the portion 62 of the body and the adjacent portion of the fitting, a recess 66 formed in the fitting being provided for this purpose.

The described structure permits each valve to be resiliently urged in fluid-sealing engagement with its seat, or sealing ring 40. When the valves are rotated from their open position of Fig. 6 to closed position, as shown in Fig. 1, the groove and tongue arrangement, 24, 26, is changed from a position where the tongue and groove extend across the line of flow to a position where they are now parallel to the line of flow. With the described slight amount of clearance between the tongue and groove, each valve may now move in an axial direction, thereby allowing the spring mounted retainer ring 42 to bias or urge each valve into sealing engagement against the resilient seat 40 on the opposite side of the valve.

The fitting 58 and the body 14 are connected so that no twist will be imparted to the hose or pipe connected to the fitting. A swivel connection is provided between the coupling body and the fitting so the body may be circumferentially rotated with respect to the fixed fitting. This is accomplished by providing annular grooves 68 and 70 in the fitting and body, respectively, within which downwardly extending flanges 72, 72' of a pair of split retainer ring halves 74 are seated. The split ring halves may be provided with a circumferential, centrally disposed groove 76 within which is received another split retainer ring 78, the swivable connection being completed by an overlying tabbed washer 80.

To connect the coupling members A and B to rotate the valves 10 in each member to their opened and closed position, means, preferably in the form of a connecting and valve actuating ring C, is mounted to closely encircle the forward end of the body 14. The ring is abutted against a shoulder 82 extending radially from the body, and is mounted for selective rotation with respect to, or rotation with, the body, as will be subsequently explained. On its rear face, the ring is provided with a segment 84 of gear teeth extending approximately 90° around the circumference of the ring. The ring is positionally related with respect to the gear segment 36 so that their gear teeth are in meshing engagement at all times.

As shown in Fig. 2, the ring is provided on its front face with a plurality of circumferentially arranged, upstanding spaced lugs 86 and 86a. In the preferred form of the invention shown, four (4) such lugs equally spaced from each other are provided, there being flat areas 88 between adjacent lugs. It will be understood that two or more spaced lugs may be used. As shown in Fig. 5, each lug is formed with an undercut 90, thereby providing a radially extending shoulder 92. As shown in Figs. 2 and 4, the lugs 86a are each formed with a chamfer 94 at each end to provide a lead-in for the mating lugs to be subsequently described. At one end of a lug, a stop 96 is provided by swaging the edge of the lug downwardly as shown. Such stop may be provided on the very end of a pair of lugs to limit rotation of the mating lugs to be described.

The described body, valve, and associated elements, including the ring, are surrounded by an actuating collar 98. The ring C is keyed for rotation with the collar by a pair of pins 100 at diametrically opposite sides. A split retaining ring 102 is disposed within an internal groove formed in the collar, a portion of the split ring bearing against the rear peripheral edge of the ring C to hold it against the shoulder 82.

The coupling member A is provided with means for maintaining the valve in locked position when closed, and for maintaining the valves in both coupling members in locked position when the valves are opened. Moreover, the rotation of the valves from closed to opened position, and vice versa, is always accomplished with the movement of the valves in phase. Also, the connection of the coupling members and the rotation of the valves is accomplished without imparting any twist to the pipes or hose connected to the coupling members.

The foregoing results preferably are attained by providing the body 14 with an axially extending cylindrical aperture 104 having a longitudinally extending slot 106 along one side thereof through the wall of the body, as shown in Fig. 8. A locking pin 108 having a radially extending projection 110 is located in the aperture with the projection protruding through the slot. The locking pin normally is urged forward or to the right, as shown in Fig. 1, by a spring 112 disposed in the aperture behind the locking pin. In the uncoupled condition, and with the valves closed, the projection is received within a notch 114 cut in the rear side of the ring C. With the projection within the notch, the ring is keyed to the body 14 so that when the collar 98, which is keyed to the ring C, is rotated, the collar, the ring and the body are rotated together with respect to the fitting 58. The valve, however, cannot open because there is no relative motion between the ring and the body, and therefore the gear portion 84 of the ring does not act upon the gear segment 36 to permit the valve to be rotated. The valve stays closed and locked. The locking pin 108 must be depressed against the action of the spring 112, and move the locking projecting out of the notch to allow the ring C to rotate with respect to the body 14, impart rotation to the gear segment 36 and rotate the valve. The body 14 is provided with means for keying it to the body of the member B, and preventing their rotation. Preferably, this is accomplished by providing the body 14 with an axially extending aligning and body keying pin 116.

To positively lock the valves of both coupling members in opened position, when the members are connected, the body 14 has secured thereto a radially extending short sleeve 118, within which is disposed a spring loaded lock ball 120. Preferably, the ball is provided with a bore 12 within which a spring 124 is received to urge the ball outwardly. The lock ball engages the inside wall of the collar 98. When the collar is permitted to rotate with respect to the body 14; that is, when the locking lug 110 is disengaged from the notch 114, the lock ball will enter an aperture 126 formed in the collar, the aperture having a diameter slightly less than the diameter of the ball.

The coupling member B comprises a hollow body 128 which is also provided with an aperture, a valve shaft, a valve, gear segment and fluid sealing means for the valve, including sealing rings, which are the same, and in the same relationship as illustrated and described in connection with these elements in the coupling member A. The same reference numerals are used to identify the same elements.

An actuating ring D is mounted on the body 128 for rotation with respect thereto. The ring D is maintained in position by a snap ring 130 which presses the ring against a shoulder 131 formed on the body. At its rear face, the actuating ring is provided with a toothed or gear portion 84 in meshing engagement with the teeth of the gear segment 36 as previously described. As shown in Fig. 3, the front face of the actuating ring is provided with spaced lugs 132 on diametrically opposite sides of the ring. The lugs each have a length slightly less than the flat areas 88 between the lugs 86 on the ring C. As also shown in Fig. 3, the front face of the body 128 is provided with a plurality of upstanding lugs 133 equidistantly spaced from each other around the body's circumference. Four (4) such lugs are shown so that they may cooperate with the four (4) spaced lugs 86 and 86a on the ring C. The socket body is formed with axially extending depressions or apertures 134 located centrally of each lug. The ring lugs 132 and a pair of body lugs 133 are adjacent each other when the coupling members are disconnected.

The internal bore of the body 128 is provided with an adjacent annular shoulder 136 against which the extreme forward edge of the nipple portion 16 of the coupling member A is adapted to be engaged. An annular groove 138 is provided forward of the shoulder, the groove having disposed therein an O-ring 140 which is adapted to surround the nipple portion 16 with a sealing squeeze-fit. A cup-like cover 142 surrounds the body 128, protecting the actuating ring and the associated elements including the gear segment, the valve shaft and the valve. The cover is fixedly secured to the body by a tabbed washer 144. The body is provided with a threaded portion 146 for connection with the internally threaded portion of fitting 148. The cover, body and fitting are fixedly connected to each other and cannot relatively rotate. The actuating ring D and, of course, the associated valve are rotatable relative to the cover, body and fitting assembly.

As shown in Figs. 1 and 9, the valve in the coupling member B is locked in closed position by means normally preventing rotation of the ring D. Specifically, this is accomplished by a spring pressed ball detent 150 housed in the body, the detent being received within a V-shaped notch 152 formed in the rear face of the actuating ring.

To couple disconnected lines having at their ends the described coupling members, the members are first pressed together in an axial direction. The member B is telescoped and received within the collar 98. The lugs 133 on the body 128 and the lugs 132 on the ring D are matingly received within the areas 88 between the lugs 86 and 86a. Such alignment is obtained before turning coupling member A more than 90°. It should be noted that the coupling members need not be aligned with the valves in the same quadrant as shown in Fig. 6. The valves may be circumferentially offset from each other 90°, as shown in Fig. 8, or 180° or 270°. The coupling member B is held in one hand and need not be turned to impart twist to the associated hose. The coupling A, with the hand encircling the collar 98, may be turned to obtain alignment of the lugs. Such turning, however, does not impart any twist to the fitting 58 and the associated hose, because as previously described, the collar 98, the ring C, and the body 14 may be rotated or swiveled together with respect to the fitting without initiating any movement of the valve.

As shown in Fig. 6, the aligning and keying pin 116 enters an aperture 134. This keys the bodies 14 and 128 to each other. The locking pin 108 is depressed against the action of its spring 112 so that the lug 110 is moved out of the notch 114 (Fig. 8), thereby allowing the ring C to be rotated. The parts are dimensionally related so that when the coupling members are thus pressed together, the nipple portion 16 engages the shoulder 136 with the nipple portion surrounded by the fluid sealing O-ring 140. When the collar 98 is now rotated, the torque applied thereto causes the ring C to rotate, thereby rotating the valve 10 toward open position through the medium of the rotating gear segment 84 in meshing engagement with the gear segment 36 secured to the valve shaft 20. As rotation of the collar begins, the end of the lugs 86 and 86a on the ring C push in a circumferential direction against the lugs 132 on the ring D, causing the ring D to be rotated together with the ring C. The valve in the member B thus rotates in phase with the valve in the member A. Although the locking detent 150 greatly resists efforts to digitally rotate the ring D when the coupling members are disconnected, a comparatively small torque applied to the collar 98 is sufficient to cause the detent to move out of the V-shaped notch 152 and allow the ring D to turn.

As the collar 98 is rotated, the shoulders 92 on the lugs 86 ride over the lugs 133 to strongly connect the coupling members together. A turning movement of only 45° is necessary to fully connect the coupling members, and completion of movement occurs when the lugs 133 engage the stops 96. At this point, the spring pressed lock ball 120 is under the aperture 126 in the collar and moves therein to indicate by sight or feel that the coupling members are completely locked together and that the valves have been rotated to their fully opened position.

To disconnect the coupling halves, the lock ball 120 is digitally depressed and the collar 98 is rotated in a reverse direction. Upon a turn of 45°, the lugs 133 move out from under the shoulders 92, the valves are rotated back to their closed position, as shown in Fig. 1, and when the coupling members are moved apart, the locking projection 110 is urged back into its associated notch 114, and the ball detent 150 has returned to its associated V-shaped locking notch 152.

It will be observed that in the coupling described, means are provided for locking the valves in both members in their closed position when the coupling halves are disconnected. In their disconnected condition, the actuating collar 98 may be turned to align the connecting means of the members, but such turning does not impart torque to the associated hose or initiate opening of the valve. Only when the coupling members are properly aligned and pressed together can connection of the members begin, and the valves unlock and begin to open. Opening of both closed and locked valves is thus responsive to the act of coupling, and upon completion of the coupling act, the members are securely connected to each other against blow-apart forces, vibration and other pull-apart forces by the ball lock. At this point, the valves have rotated in phase to their fully opened and locked position, which position is indicated by the sight-and-feel-indicating ball lock.

The parts are so dimensionally related and arranged that a continuous, unbroken and well-sealed line of fluid flow is provided by the relationship of the nipple portion and the coacting socket portion, with the internal sealing ring surrounding the nipple portion.

The described connection which permits the valve to move axially with respect to its shaft so that the valve when rotated to closed position may be firmly seated in fluid-sealing engagement against the resilient sealing ring 40, while affording positive rotation of the valve, constitutes an arrangement which may be used in pipes or conduits generally, or other than in a coupling, and the valve may be rotated by any suitable external means.

The coupling members are so constructed and related that any parts which could otherwise be damaged or tampered with to put the mechanism out of order are concealed. For example, the gear segments, the gear portions on the actuating and connecting rings and the co-acting shafts for turning the valves are completely hidden. The relatively rugged collar surrounds and protects the elements of the nipple half. The nipple portion 16, the aligning and keying pin 116, the depressible locking pin 108, and the extreme front face of the ring C with its lugs 86 and 86a, are all surrounded and set in axially with respect to the forward edge of the collar. With regard to the socket half of the coupling, the rugged cover 142 completely surrounds the operative parts. The actuating ring D and its lugs 132 and body lugs 133 similarly are protected, because none of these parts extend forward in an axial direction beyond the cover.

It is believed that the advantages of the described quick disconnect coupling will be apparent from the foregoing detailed disclosure. It will also be apparent that while the invention has been described and illustrated in a preferred form, numerous changes may be made to obtain equivalent structures for the accomplishment of the described improved results without departing from the spirit and scope of the invention, as sought to be defined in the following claims.

We claim:

1. A quick disconnect coupling comprising a pair of coupling members, said members each comprising a hollow body and a plug valve mounted therein for rotation about an axis generally perpendicular to the line of flow through the body, a valve actuating ring rotatably mounted on each of said bodies, engaging means intermediate each valve actuating ring and its respective valve whereby rotation of the actuating rings with respect to their associated bodies will cause the valves to be rotated, connecting means provided on one of the bodies, a first ring on the opposite body having means formed for mating connection with said connecting means, means preventing rotation of said first ring when the coupling members are disconnected, means holding the second ring against rotation when the coupling members are disconnected, said means for preventing rotation of the first ring being responsive to the engagement of the rings to allow said first ring to rotate, the rotation of said first ring overcoming the force of the means holding the second ring against rotation, whereby pressing the coupling members together in an axial direction and turning the first ring causes the first ring to rotate and open its associated valve, the rotation of the first ring directly rotating the second ring so that both valves are opened in phase, the mating connecting means securely connecting the coupling members together.

2. A quick disconnect coupling comprising a pair of coupling members, said members each comprising a hollow body and a plug valve mounted therein for rotation about an axis generally perpendicular to the line of flow through the body, one body having a nipple portion, the other body having a socket portion and an internal sealing ring to receive said nipple portion with the sealing ring surrounding the nipple portion, a valve actuating ring rotatably mounted on each of said bodies, engaging means intermediate each valve actuating ring and its respective valve whereby rotation of the actuating rings with respect to their associated bodies will cause the valves to be rotated, connecting means provided on one of the bodies, a first ring on the opposite body having means formed for mating connection with said body connecting means, means preventing rotation of said first ring when the coupling members are disconnected, resilient means holding the second ring against rotation when the coupling members are disconnected, said means for preventing rotation of the first ring being responsive to the engagement of the rings to allow said first ring to rotate, the rotation of said first ring overcoming the force of the means resiliently holding the second ring against rotation, whereby pressing the coupling members together in an axial direction and turning the first ring causes the first ring to rotate and open its associated valve, the rotation of the first ring directly rotating the second ring so that both valves are opened in phase, the mating connecting means securely connecting the coupling members together.

3. A quick disconnect coupling comprising a pair of coupling members, said members each comprising a hollow body and a plug valve mounted therein for rotation about an axis generally perpendicular to the line of flow through the body, one body having a nipple portion, the other body having a socket portion and an internal sealing ring to receive said nipple portion with the sealing ring surrounding the nipple portion, a valve actuating ring rotatably mounted on each of said bodies, engaging means intermediate each valve actuating ring and its respective valve whereby rotation of the actuating rings with respect to their associated bodies will cause the valves to be rotated, connecting means provided on one of the bodies, a first ring on the opposite body having means formed for mating connection with said body connecting means, means preventing rotation of said first ring when the coupling members are disconnected, resilient means holding the second ring against rotation when the coupling members are disconnected, said means for preventing rotation of the first ring being responsive to the engagement of the rings to allow said first ring to rotate, the rotation of said first ring overcoming the force of the means resiliently holding the second ring against rotation, and means for limiting the rotation of said rings and locking said valves in open position, whereby pressing the coupling members together in an axial direction and turning the first ring causes the first ring to rotate and open its associated valve, the rotation of the first ring directly rotating the second ring so that both valves are opened in phase, the mating connecting means securely connecting the coupling members together, and locking said valves in open position.

4. A quick disconnect coupling comprising a pair of coupling members, said members each comprising a hollow body and a plug valve mounted therein for rotation about an axis generally perpendicular to the line of flow through the body, a fitting connected to each body, a swivel connection between one body and its fitting, the connection of the second body with its fitting being fixed, connecting means provided on said second body, a valve actuating ring rotatably mounted on each of said bodies, engaging means intermediate each valve actuating ring and its respective valve whereby rotation of the actuating rings with respect to their associated bodies will cause the valves to be rotated, the first body ring having means formed for mating connection with said connecting means, the second body ring being provided with means for engaging the first body ring so that upon rotation of the first body ring the second body ring will rotate therewith, releasable means for locking the valve in closed position provided on said first body by keying the first body to its ring for their rotation together with respect to the associated fitting, said means releasing the ring for rotation with respect to the body upon engagement of the coupling members, releasable means holding the second body ring against rotation when the coupling members are disconnected to thereby maintain the second body valve in closed position, keying means provided by said bodies to prevent their relative rotation, whereby pressing the two members together in axial direction and turning said first body ring causes the bodies to be keyed together against relative rotation, the release of the first body ring to allow the ring to rotate and open the valve of the first body, the rotation of said first body ring overcoming the force of the releasable means holding the second body ring against rotation so that the second body ring is directly rotated and both valves open in phase, and the mating connecting means securely connect the members together, the arrangement whereby the first body and its ring are keyable together to rotate as a unit with respect to the associated fitting serving to prevent the application of torque to the fitting as the coupling member is rotated to align the aforementioned connecting means.

5. A quick disconnect coupling comprising a pair of coupling members, said members each comprising a hollow body and a plug valve mounted therein for rotation about an axis generally perpendicular to the line of flow through the body, a fitting connected to each body, a swivel connection between one body and its fitting, the connection of the second body with its fitting being fixed, one body having a nipple portion, the other body having a socket portion and an internal sealing ring to receive said nipple portion with the sealing ring surrounding the nipple portion, connecting means provided on the fixedly connected body, a valve actuating ring rotatably mounted on each of said bodies, engaging means intermediate each valve actuating ring and its respective valve whereby rotation of the actuating rings with respect to their associated bodies will cause the valves to be rotated, the ring on the swivel connected body having means formed for mating connection with said connecting means, the second ring being provided with means for engaging the first ring so that upon rotation of the first ring the second ring will rotate therewith, releasable means for locking the valve in closed position provided on said swivel connected body by keying the body to said first ring for their rotation together with respect to the associated fitting, said means releasing the ring for rotation with respect to the body upon engagement of the coupling members, releasable means holding the second ring against rotation when the coupling members are disconnected to thereby maintain the second body valve in closed position, keying means provided by one body for engagement with means provided by the other body to prevent rotation of the swivel connected body, whereby pressing the two members together in an axial direction and turning said first ring causes the bodies to be keyed together against rotation and the release of the first ring to allow the ring to rotate and open its associated valve, the rotation of said first ring overcoming the force of the releasable means holding the second ring against rotation so that the second ring is directly rotated and both valves open in phase, and the mating connecting means securely connect the members together, the arrangement whereby the rotatable body and its ring are keyable together to rotate as a unit with respect to the associated fitting serving to prevent the application of torque to the fitting as the coupling member is rotated to align the aforementioned connecting means.

6. A quick disconnect coupling comprising a pair of coupling members, said members each comprising a hollow body and a plug valve mounted therein for rotation about an axis generally perpendicular to the line of flow through the body, a fitting connected to each body, a swivel connection between one body and its fitting, the connection of the second body with its fitting being fixed, the first body having a nipple portion, the second body having a socket portion and an internal sealing ring to receive said nipple portion with the sealing ring surrounding the nipple portion, connecting means provided on said second body, a valve actuating ring rotatably mounted on each of said bodies, engaging means intermediate each valve actuating ring and its respective valve whereby rotation of the actuating rings with respect to their associated bodies will cause the valves to be rotated, the first body ring having means formed for mating connection with said second body connecting means, the second body ring being provided with means for engaging the first body ring so that upon rotation of the first body ring the second body ring will rotate therewith, releasable means for locking the valve in closed position provided on said first body by keying the first body to its ring for their rotation together with respect to the associated fitting, said means releasing the ring for rotation with respect to the body upon engagement of the coupling members, releasable means holding the second body ring against rotation when the coupling members are disconnected to thereby maintain the second body valve in closed position, keying means provided by said bodies to prevent their relative rotation, whereby pressing the two members together in an axial direction and turning said body ring causes the bodies to be keyed together against relative rotation and the release of the first body ring to allow the ring to rotate and open the valve of the first body, the rotation of said first body ring overcoming the force of the releasable means holding the second body ring against rotation so that the second body ring is directly rotated and both valves open in phase, and the mating connecting means securely connecting the members together, the arrangement whereby the first body and its ring are keyable together to rotate as a unit with respect to the associated fitting serving to prevent he application of torque to the fitting as the coupling member is rotated to align the aforementioned connecting means.

7. A quick disconnect coupling comprising a pair of coupling members, said members each comprising a hollow body and a plug valve mounted therein for rotation about an axis generally perpendicular to the line of flow through the body, a fitting connected to each body, a swivel connection between one body and its fitting, the connection of the second body with its fitting being fixed, the first body having a nipple portion, the second body having a socket portion and an internal sealing ring to receive said nipple portion with the sealing ring surrounding the nipple portion, connecting means provided on said second body, a valve actuating ring rotatably mounted on each of said bodies, engaging means intermediate each valve actuating ring and its respective valve whereby rotation of the actuating rings with respect to their associated bodies will cause the valves to be rotated, the first body ring having means formed for mating connection with said second body connecting means, the second body ring being provided with means for engaging the first body ring so that upon rotation of the first body ring the second body ring will rotate therewith, releasable means for locking the valve in closed position provided on said first body by keying the first body to its ring for their rotation together with respect to the associated fitting, said means releasing the ring for rotation with respect to the body upon engagement of the coupling members, releasable means holding the second body ring against rotation when the coupling members are disconnected to thereby maintain the second body valve in closed position, keying means provided by said bodies to prevent their relative rotation, and means for limiting the rotation of the rings and locking the valves in their open position, whereby pressing the two members together in an axial direction and turning said first body ring causes the bodies to be keyed together against relative rotation and the release of the first body ring to allow the ring to rotate and open the valve of the first body, the rotation of said first body ring overcoming the force of the releasable means holding the second body ring against rotation so that the second body ring is directly rotated and both valves open in phase and are locked in open position, the mating connecting means securely connecting the members together, the arrangement whereby the first body and its ring are keyable together to rotate as a unit with respect to the associated fitting serving to prevent the application of torque to the fitting as the coupling member is rotated to align the aforementioned connecting means.

8. A quick disconnect coupling comprising a pair of coupling members, said members each comprising a hollow body and a plug valve mounted therein for rotation about an axis generally perpendicular to the line of flow through the body, a fitting connected to each body, a swivel connection between one body and its fitting, the connection of the second body with its fitting being fixed, the first body having a nipple portion, the second body having a socket portion and an internal sealing ring to receive said nipple portion with the sealing ring surrounding the nipple portion, connecting means provided on said second body, a valve actuating ring rotatably mounted on each of said bodies, engaging means intermediate each valve actuating ring and its respective valve whereby rotation of the actuating rings with respect to their associated bodies will cause the valves to be rotated, the first body ring having means formed for mating connection with said second body connecting means, the second body ring being provided with means for engaging the first body ring so that upon rotation of the first body ring the second body ring will rotate therewith, releasable means for locking the valve in closed position provided on said first body by keying the first body to its ring for their rotation together with respect to the associated fitting, said means releasing the ring for rotation with respect to the body upon engagement of the coupling members, releasable means holding the second body ring against rotation when the coupling members are disconnected to thereby maintain the second body valve in closed position, keying means provided by the first body engaging means provided by the second body to prevent rotation of the first body, an actuating collar for rotating said first body ring fixedly secured thereto, an aperture formed in said collar, a cover fixedly secured to said second body and associated fitting, a lock ball intermediate said collar and said first body adapted to enter said aperture formed in said collar, whereby pressing the two members together in an axial direction and turning said collar causes the bodies to be keyed together against rotation and the release of the first body ring to allow the ring to rotate and open the valve of the first body, the rotation of said first body ring overcoming the force of the means holding the second body ring against rotation so that the second body ring is directly rotated and both valves open in phase, the mating connecting means securely connecting the members together, and the lock ball entering the aperture in the collar to lock the valves in their opened position, the arrangement whereby the first body, its ring and collar are keyable together to rotate as a unit with respect to the associated fitting serving to prevent the application of torque to the fitting as the coupling member is rotated to align the aforementioned connecting means.

9. A quick disconnect coupling comprising a pair of coupling members, said members each comprising a hollow body and a plug valve mounted therein for rotation about an axis generally perpendicular to the line of flow through the body, a fitting connected to each body, a swivel connection between one body and its fitting, the connection of the second body with its fitting being fixed, the first body having a nipple portion, the second body having a socket portion and an internal sealing ring to receive said nipple portion with the sealing ring surrounding the nipple portion, connecting means provided on said second body, a valve actuating ring rotatably mounted on each of said bodies, said rings each being provided with a gear segment in meshing engagement with a gear segment connected to each of said valves, whereby rotation of the actuating rings with respect to their associated bodies will cause the valves to be rotated, the first body ring having means formed for mating connection with said second body connecting means, the second body ring being provided with means for engaging the first body ring so that upon rotation of the first body ring the second body ring will rotate therewith, releasable means for locking the valve in closed position provided on said first body by keying the first body to its ring for their rotation together with respect to the associated fitting, said means releasing the ring for rotation with respect to the body upon engagement of the coupling members, releasable means holding the second body ring against rotation when the coupling members are disconnected to thereby maintain the second body valve in closed position, keying means provided by the first body engaging means provided by the second body to prevent relative rotation of the bodies, an actuating collar for rotating said first body ring fixedly secured thereto, an aperture formed in said collar, a cover fixedly secured to said second body and associated fitting, a lock ball intermediate said collar and said first body adapted to enter said aperture formed in said collar, whereby pressing the two members together in an axial direction and turning said collar causes the bodies to be keyed together against rotation and the release of the first body ring to allow the ring to rotate and open the valve of the first body, the rotation of said first body ring overcoming the force of the means holding the second body ring against rotation so that the second body ring is directly rotated and both valves opened in phase, the mating connecting means of said second body and said first body ring securely connecting the members together, and the lock ball entering the aperture in the collar to lock the valves in their opened position, the arrangement whereby the first body, its ring and collar are keyable together to rotate as a unit with respect to the associated fitting serving to prevent the application of torque to the fitting as the coupling member is rotated to align the aforementioned connecting means.

10. A quick disconnect coupling comprising a pair of coupling members, said members each comprising a hollow body, a plug valve mounted in one of said bodies for rotation about an axis generally perpendicular to the line of flow through the body, a valve actuating ring rotatably mounted on said body for rotation about an axis parallel to said line of flow, engaging means intermediate the valve actuating ring and the valve whereby rotation of the ring with respect to the body will cause the valve to rotate, releasable means for preventing rotation of the ring with respect to the body, whereby the valve is locked in closed position when said coupling members are disconnected, said means being responsive to the axial engagement of said coupling members to release the ring and allow rotation thereof to open the valve.

11. A quick disconnect coupling as set forth in claim 10, wherein the valve is connected to a shaft by mating means formed so that the valve may move with respect to the shaft in an axial direction parallel to the line of flow when the valve is rotated to closed position, the body having an annular groove formed therein, a sealing ring disposed in said groove adapted to be engaged by one side of the valve, a resiliently mounted valve retainer ring in the body engaging the opposite side of the valve.

12. A valve structure comprising a hollow body, a shaft mounted therein for rotation about an axis generally perpendicular to the line of flow through the body, and a valve connected to said shaft by mating means formed so that the valve may move with respect to the shaft in an axial direction parallel to the line of flow when the valve is rotated to closed position, an annular groove formed in said body, a sealing ring disposed in said groove and engaging one side of the valve, and a resiliently mounted retainer ring in said body on the opposite side of the valve urging the valve against said sealing ring.

13. A valve structure comprising a hollow body, a shaft mounted therein for rotation about an axis generally perpendicular to the line of flow through the body, and a valve connected to said shaft by a mating tongue and groove, there being a slight amount of clearance between said tongue and the adjacent side walls of the groove to permit relative movement of the valve with respect to the shaft, said tongue and groove extending in a direction parallel to the line of flow through the body when the valve is in closed position, an annular groove formed in said body, a sealing ring disposed in said groove for engagement with one side of the valve, and a resiliently mounted retainer ring in said body on the opposite side of the valve urging the valve against said sealing ring.

14. A valve structure as set forth in claim 13, wherein an O ring is disposed within a groove provided between said shaft and said body, the lower end of the shaft being provided with a headed portion having a groove formed therein, and the valve is provided with a tongue received in said groove.

15. A fluid coupling comprising a pair of coupling members, said members each comprising a fluid fitting, a hollow body in each fitting, a plug valve mounted in each body for rotation about an axis generally perpendicular to the line of flow through the body, a valve actuating ring rotatably mounted on each of said bodies, interengaging means formed on each valve actuating ring and on its respective valve whereby rotation of the actuating rings with respect to their associated bodies will cause the valves to be rotated, means for rotatably mounting one of said bodies in its fitting, interfitting coupling member connecting means formed on one of said bodies and on the actuating ring on the other body, interfitting circumferential drive means on said rings, latch means preventing rotation of one of said rings relative to its body when the coupling members are disconnected, means for releasing said latch means upon coupling of said members to allow the associated valve actuating ring to rotate relative to its body, resilient detent means holding the other actuating ring against rotation relative to its body when the coupling members are disconnected, a manipulating collar connected to the ring associated with the rotatably mounted body, releasable lock means for holding one of said rings in its valve open position, whereby pressing the coupling members together in an axial direction releases said latch means, and turning said collar causes the associated ring to rotate and open its associated valve, the rotation of said latter ring directly rotating the other ring by means of said circumferential drive means so that the other valve is opened, said lock means acting to lock the valves in their open position when the coupling members are coupled and to keep said coupling members coupled.

16. A fluid coupling comprising a pair of coupling members, said members each comprising a fluid fitting, a hollow body in each fitting, a plug valve mounted in each body for rotation about an axis generally perpendicular to the line of flow through the body, a valve actuating ring rotatably mounted on each of said bodies, interengaging means formed on each valve actuating ring and on its respective valve whereby rotation of the actuating rings with respect to their associated bodies will cause the valves to be rotated, means for rotatably mounting one of said bodies in its fitting, interfitting coupling member connecting means formed on one of said bodies and on the actuating ring on the other body, interfitting circumferential drive means on said rings, latch means preventing rotation of one of said rings relative to its body when the coupling members are disconnected, means for releasing said latch means upon coupling of said members to allow the associated valve actuating ring to rotate relative to its body, resilient detent means holding the other actuating ring against rotation relative to its body when the coupling members are disconnected, a manipulating collar connected to the ring associated with the rotatably mounted body, a spring pressed lock ball mounted on the body associated with said last named ring, said collar having an aperture to receive said ball, whereby pressing the coupling members together in an axial direction releases said latch means, and turning said collar causes the associated ring to rotate and open its associated valve, the rotation of said latter ring directly rotating the other ring by means of said circumferential drive means so that the other valve is opened, said lock ball entering said aperture in the collar when the coupling members are coupled to lock the valves in their open position and to keep said coupling members coupled.

17. A quick disconnect valved coupling comprising a pair of coupling members, said members each comprising a fluid fitting and a hollow body, means rotatably mounting one of said bodies on its fitting, a plug valve mounted in each body for rotation about an axis generally perpendicular to the line of flow through the body, a valve actuating ring mounted on each of said bodies for rotation about an axis parallel to said line of flow, interengaging means on each ring and on its valve whereby rotation of the rings with respect to their associated bodies will cause the valves to be rotated, said rings being provided with circumferentially engaging abutment means so that upon axial engagement of the coupling members and rotation of one ring, the other ring will be rotated, means for coupling said members together, and latch means mounted on said one body for securing the ring mounted on such body against rotation relative to the body when the coupling members are disconnected, and means for releasing said latch means upon coupling of said members to provide for rotation of the previously latched ring relative to its body.

18. A quick disconnect coupling as set forth in claim 16, wherein each valve is connected to a shaft by mating means formed so that the valve may move with respect to the shaft in an axial direction parallel to the line of flow when the valve is rotated to closed position, said bodies each having an annular groove formed therein, a sealing ring disposed in said groove adapted to be engaged by one side of the valve, said bodies each containing a resiliently mounted ring, said resiliently mounted ring engaging the opposite side of the valve.

19. A quick disconnect valved coupling comprising a pair of coupling members, said members each comprising a fluid fitting and a hollow body, means rotatably mounting one of said bodies with respect to its fitting, a plug valve mounted in each body for rotation about an axis generally perpendicular to the line of flow through the body, a valve actuating ring mounted on each of said bodies for rotation about an axis parallel to said line of flow, interengaging means on each ring and on its valve whereby rotation of the rings with respect to their associated bodies will cause the valves to be rotated, an actuating sleeve on said one body keyed to the associated ring, said rings being provided with circumferentially engaging abutment means so that upon axial engagement of the coupling members and rotation of one ring, the other ring will be rotated, means for coupling said members together, and latch means mounted on said one body for securing the ring mounted on such body against rotation relative to the body when the coupling members are disconnected, and means for releasing said latch means upon coupling of said members to provide for rotation of the previously latched ring relative to its body, a sleeve fixed to the other body and overlying its actuating ring to protect it against accidental dislodgement when the body is uncoupled, and detent means between said other body and ring to maintain said ring and associated valve in the closed position when the parts are uncoupled.

References Cited in the file of this patent

UNITED STATES PATENTS

| | | |
|---|---|---|
| 974,501 | Leonard | Nov. 1, 1910 |
| 1,428,933 | Bean | Sept. 12, 1922 |
| 1,495,516 | Hobart | May 27, 1924 |
| 2,719,022 | Blevans | Sept. 27, 1955 |